(12) United States Patent
Muthusamy et al.

(10) Patent No.: US 10,077,212 B2
(45) Date of Patent: Sep. 18, 2018

(54) CEMENT COMPATIBLE WATER-BASED DRILLING MUD COMPOSITIONS

(71) Applicant: Halliburton Energy Services, Inc., Houston, TX (US)

(72) Inventors: Ramesh Muthusamy, Maharashtra (IN); Abhimanyu Pramod Deshpande, Maharashtra (IN); Rahul Chandrakant Patil, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 14/915,828

(22) PCT Filed: Oct. 8, 2013

(86) PCT No.: PCT/US2013/063833
§ 371 (c)(1),
(2) Date: Mar. 1, 2016

(87) PCT Pub. No.: WO2015/053750
PCT Pub. Date: Apr. 16, 2015

(65) Prior Publication Data
US 2016/0214901 A1    Jul. 28, 2016

(51) Int. Cl.
| | | |
|---|---|---|
| *C04B 28/14* | (2006.01) | |
| *E21B 33/13* | (2006.01) | |
| *C09K 8/08* | (2006.01) | |
| *C09K 8/46* | (2006.01) | |
| *C09K 8/467* | (2006.01) | |
| *C04B 28/00* | (2006.01) | |
| *C04B 28/02* | (2006.01) | |
| *C04B 28/18* | (2006.01) | |
| *C04B 28/26* | (2006.01) | |
| *E21B 21/00* | (2006.01) | |
| *E21B 33/14* | (2006.01) | |

(52) U.S. Cl.
CPC ............ *C04B 28/14* (2013.01); *C04B 28/006* (2013.01); *C04B 28/02* (2013.01); *C04B 28/021* (2013.01); *C04B 28/18* (2013.01); *C04B 28/26* (2013.01); *C09K 8/08* (2013.01); *C09K 8/46* (2013.01); *C09K 8/467* (2013.01); *E21B 21/003* (2013.01); *E21B 33/14* (2013.01); *C09K 2208/12* (2013.01); *Y02P 40/165* (2015.11)

(58) Field of Classification Search
None
See application file for complete search history.

(56) References Cited

U.S. PATENT DOCUMENTS

| | | | | |
|---|---|---|---|---|
| 5,314,022 A | * | 5/1994 | Cowan | C04B 28/08 166/292 |
| 5,358,044 A | * | 10/1994 | Hale | C04B 18/049 166/293 |
| 5,874,387 A | | 2/1999 | Carpenter et al. | |
| 7,147,067 B2 | * | 12/2006 | Getzlaf | C04B 12/005 175/64 |
| 7,448,450 B2 | * | 11/2008 | Luke | C04B 14/047 106/813 |
| 7,544,640 B2 | | 6/2009 | Luke et al. | |
| 8,563,479 B2 | | 10/2013 | Amanullah et al. | |
| 2006/0178274 A1 | * | 8/2006 | Maresh | C09K 8/12 507/110 |
| 2012/0305248 A1 | | 12/2012 | Ravi et al. | |

FOREIGN PATENT DOCUMENTS

WO    WO 2012-176000 A2    12/2012

OTHER PUBLICATIONS

Barnard, et al. "A Scientific Study of Lassenite," Jun. 2010, Camosun College—Environmental Technology Program.*
"On Site Treatment of Invert Drilling Waste," Western Site Technologies Inc., no date, retrieved Jun. 8, 2017 from http://mudloc.westernsite.com/docs/Master%20Brochure%20-%20Onsite%20Treatment%20of%20Invert%20Drilling%20Waste.pdf.*
Lassenite Trademark Information, Pozzolan-based additives for cement mixtures, retrieved Jun. 8, 2017 from http://www.trademarkia.com/lassenite-78351374.html.*
Sharma et al., "Zeolite as a Cementitious Material in Concrete Mix," Feb. 2016, International Journal of Research in Engineering, Science and Technologies, vol. 1, No. 9, retrieved Jun. 8, 2017 from http://ijrests.org/publicationpaper/PaperCI91.pdf.*
Official action No. 4428 for Colombian Patent Application No. 16-059.406, prepared by the Colombian Intellectual Property Office, dated Apr. 19, 2016. (4 pages).
Examination Report for Australian Patent Application No. 2013402487, prepared by the Australian Intellectual Property Office, dated Jul. 13, 2016. (3 pages).
International Search Report and Written Opinion prepared by the ISA/KR for International application No. PCT/US2013/063833, dated Jul. 24, 2014, 19 pages.

* cited by examiner

*Primary Examiner* — Angela M DiTrani
(74) *Attorney, Agent, or Firm* — Haynes and Boone, LLP

(57) ABSTRACT

A water-based drilling mud for use in cementing operations includes water, LASSENITE® pozzolan-based additive, a heavy-weight additive, a viscosifier, a dispersant and at least one of a set activator, a fluid loss control additive and a shale stabilizer. A method of using the same includes allowing a cement composition to mix with the water-based drilling mud and allowing the mixture of the cement composition and the water-based drilling mud to set.

17 Claims, 1 Drawing Sheet

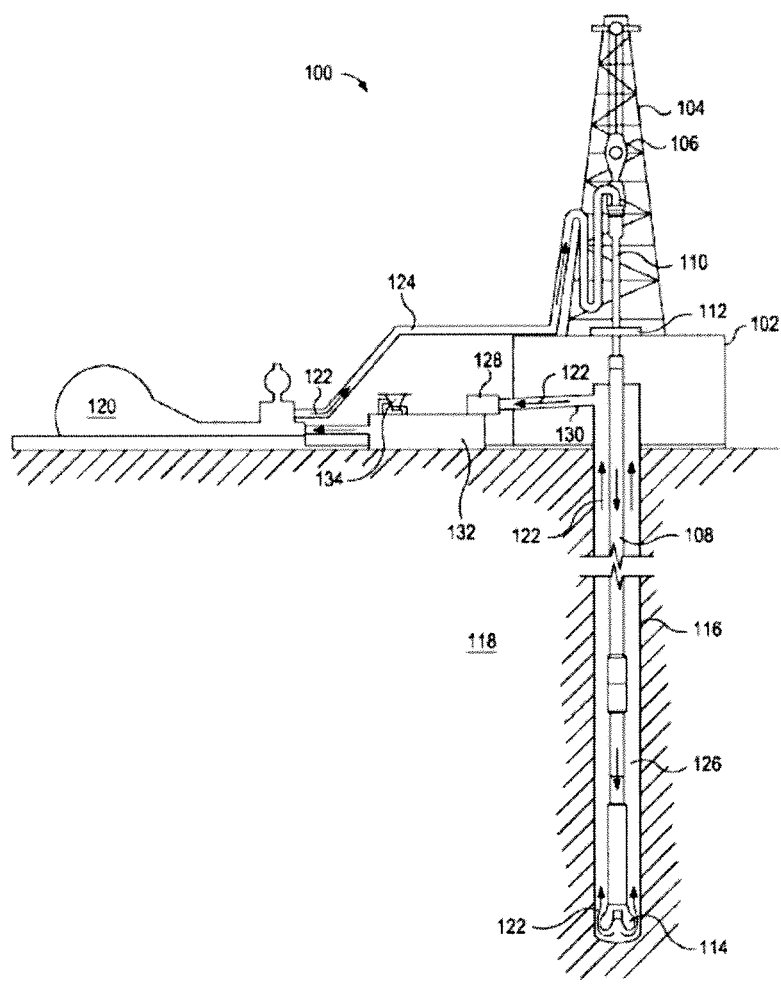

CEMENT COMPATIBLE WATER-BASED DRILLING MUD COMPOSITIONS

FIELD OF THE INVENTION

The present embodiments generally relate to cement compatible water-based drilling mud compositions for use in subterranean drilling and cementing operations. More particularly, the water-based drilling mud compositions include LASSENITE® pozzolan-based additive.

BACKGROUND

The following paragraphs contain some discussion, which is illuminated by the innovations disclosed in this application, and any discussion of actual or proposed or possible approaches in this Background section does not imply that those approaches are prior art.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well operations, it is common to introduce drilling fluids, sometimes referred to as drilling muds, into the wellbore. These drilling muds are used to provide hydrostatic pressure to prevent formation fluids from entering the wellbore, to keep the drill bit cool and clean during drilling, to remove drill cuttings, and to suspend drill cuttings when drilling is suspended when the drilling assembly is brought in and out of the wellbore. The specific drilling mud chosen is selected to avoid formation damage and to limit corrosion and can be selected from water-based muds, oil-based muds and gaseous muds.

During the drilling of subterranean wellbores, it is not uncommon to encounter strata that include reactive shales. As used herein, the term "shale" means materials such as certain types of clays (for example, bentonite) and related subterranean materials that may "swell," or increase in volume, when exposed to water. Reactive shales may be problematic during drilling operations because of their tendency to degrade when exposed to aqueous media such as aqueous-based drilling muds. This degradation, of which swelling is one example, can result in undesirable drilling conditions and undesirable interference with the drilling mud. For instance, the degradation of the shale may interfere with attempts to maintain the integrity of drilled cuttings traveling up the well bore until such time as the cuttings can be removed by solids control equipment located at the surface. Degradation of drilled cuttings prior to their removal at the surface greatly prolongs drilling time, because shale particles traveling up the well bore break up into smaller and smaller particles, which increasingly exposes new surface area of the shale to the drilling mud, which leads to still further absorption of water, and further degradation.

Typical drilling muds generally include clays, heavy-weight additives and viscosifiers suspended in either a water or oil based fluid. The clays are generally a combination of native clays and bentonite, a three-layer clay that swells in the presence of water. Generally, when the drilling muds are being pumped into the wellbore, they are in a thin, free-flowing liquid phase. However, when the pumping is stopped, the static fluids form a gel that resists flow. It is generally very difficult to remove the drilling mud from the wellbore when it is in its gel form versus its liquid form.

During well completion, it is also common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, squeeze cementing, or gravel packing operations.

Generally, the presence of gelled drilling mud impairs the rheological and mechanical properties of the cement composition, such as compressive strength development and the ability of the cement composition to set properly in the wellbore. Such situations can lead to poor bonding between the cement composition and the formation, as well as between the cement composition and the casing. Typically, a spacer fluid is circulated in the wellbore to remove the drilling mud before cementing operations; however, such spacer fluids do not entirely remove the drilling mud, especially any gelled drilling mud. Therefore, a drilling mud that could remain in fluid form in the wellbore and mix with cement compositions without impairing the rheological, cementitious and mechanical properties of a cementing operation would be advantageous.

BRIEF DESCRIPTION OF THE DRAWING

The FIGURE depicts a schematic view of a wellbore drilling assembly, according to several exemplary embodiments.

DETAILED DESCRIPTION

It is to be understood that the following disclosure provides many different embodiments, or examples, for implementing different features of various embodiments. Specific examples of components are described below to simplify and exemplify the present disclosure. These are, of course, merely examples and are not intended to be limiting.

According to several exemplary embodiments, a water-based drilling mud composition is provided. According to several exemplary embodiments, the water-based drilling mud composition includes water, LASSENITE® pozzolan-based additive, a heavy-weight additive, a viscosifier, a set activator, and a dispersant.

According to several exemplary embodiments, the water-based drilling mud composition includes water, LASSENITE® pozzolan-based additive, a heavy-weight additive, a viscosifier, a dispersant, a fluid loss control additive and a shale stabilizer. In an exemplary embodiment, the water-based drilling mud composition further includes a set activator.

According to several exemplary embodiments, the water-based drilling mud composition includes water. The water may be fresh water, brackish water, saltwater, or any combination thereof. The water is present in the water-based drilling mud compositions in an amount of from about 250.0 to about 300.0 pounds/barrel (lb/bbl) of the water-based drilling mud composition.

According to several exemplary embodiments, the water-based drilling mud composition includes LASSENITE® pozzolan-based additive, an aluminosilicate. On the basis of an oxide analysis, the LASSENITE® pozzolan-based additive includes at least silicon dioxide ($SiO_2$) and aluminum oxide ($Al_2O_3$). According to several exemplary embodiments, the LASSENITE® pozzolan-based additive is present in the water-based drilling mud composition in an amount of from about 100.0 lb/bbl to about 150.0 lb/bbl of the water-based drilling mud composition.

According to several exemplary embodiments, the LASSENITE® pozzolan-based additive includes silicon dioxide ($SiO_2$), aluminum oxide ($Al_2O_3$), sodium oxide ($Na_2O$), magnesium oxide (MgO), sulfur trioxide ($SO_3$), potassium oxide ($K_2O$), calcium oxide (CaO), titanium dioxide ($TiO_2$), iron (III) oxide ($Fe_2O_3$), and combinations thereof in any proportion. In several exemplary embodiments, the $SiO_2$ and $Al_2O_3$ comprise at least 80% by weight of the total oxides of the LASSENITE® pozzolan-based additive. According to several exemplary embodiments, the $SiO_2$ is present in an amount of about 65% to about 75% by weight of the total oxides of the LASSENITE® pozzolan-based additive. According to several exemplary embodiments, the $Al_2O_3$ is present in an amount of from about 10% to about 15% by weight of the total oxides of the LASSENITE® pozzolan-based additive.

According to several exemplary embodiments, the water-based drilling mud composition includes one or more heavy-weight additives that act to increase the density of the water-based drilling mud composition. Such heavy-weight additives include, without limitation, barium sulfate, iron powder, metal oxides and combinations thereof. In several exemplary embodiments, the heavy-weight additive is present in the water-based drilling mud composition in an amount of from about 100.0 lb/bbl to about 150.0 lb/bbl of the water-based drilling mud composition. In several exemplary embodiments, the density of the water-based drilling mud composition is from about 5.0 pounds per gallon (ppg) to about 20.0 ppg, from about 9.0 ppg to about 14.0 ppg, or from about 11.0 ppg to about 13.0 ppg.

According to several exemplary embodiments, the water-based drilling mud composition includes one or more viscosifiers. Such viscosifiers include, without limitation, any of the class of polysaccharide polymers, synthetic polymers, or combinations thereof. In several exemplary embodiments, the viscosifier is present in the water-based drilling mud composition in an amount of from about 0.2 lb/bbl to about 0.7 lb/bbl of the water-based drilling mud composition.

According to several exemplary embodiments, the water-based drilling mud composition includes one or more set activators, which act to facilitate the setting of a cement composition when mixed with the water-based drilling mud composition. Such set-activators include, without limitation, soluble silicates, such as sodium silicate, soluble aluminates, such as sodium aluminate, alkali metal hydroxides such as sodium hydroxide and potassium hydroxide, alkali earth metal hydroxides such as calcium hydroxide and magnesium hydroxide, alkali carbonates such as sodium carbonate and potassium carbonate, alkali hydrogen carbonates such as sodium hydrogen carbonate and potassium hydrogen carbonate, and alkali earth metal carbonates such as calcium carbonate. In several exemplary embodiments which include a set activator, the set activator is present in the water-based drilling mud composition in an amount of from about 0.5 lb/bbl to about 6.0 lb/bbl of the water-based drilling mud composition.

According to several exemplary embodiments, the water-based drilling mud composition includes one or more dispersants. Such dispersants include, without limitation, organosulfur compounds, polycarboxylate ethers and combinations thereof. In several exemplary embodiments, the dispersant is present in the water-based drilling mud composition in an amount of from about 0.5 lb/bbl to about 3.0 lb/bbl of the water-based drilling mud composition.

According to several exemplary embodiments, the water-based drilling mud composition includes one or more fluid loss control additives also known as filtration control additives. Such fluid loss control additives include, without limitation, modified starches, cellulosic polymers, synthetic polymers, polysaccharides, carbohydrates and combinations thereof. In several exemplary embodiments, the fluid loss control additive is present in the water-based drilling mud composition in an amount of from about 1.0 lb/bbl to about 5.0 lb/bbl of the water-based mud composition.

According to several exemplary embodiments, the water-based drilling mud composition includes one or more shale stabilizers. Such shale stabilizers include, without limitation, polyamines, such as ethoxylated polyamines, glycerines, silicates, dextrins and combinations thereof. In several exemplary embodiments, the shale stabilizer is present in the water-based drilling mud composition in an amount from about 2.0 lb/bbl to about 10.0 lb/bbl of the water-based drilling mud composition.

According to several exemplary embodiments, a cementitious composition including a water-based drilling mud as described above and a cement composition is provided. According to several exemplary embodiments, the cement composition includes an aqueous fluid and cement. In several exemplary embodiments, modifying additives are included in the cement composition.

According to several exemplary embodiments, the cement composition includes an amount of an aqueous fluid sufficient to form a pumpable cementitious slurry. In several exemplary embodiments, the aqueous fluid is water. The water may be fresh water, brackish water, saltwater, or any combination thereof. The water may be present in the cement composition in an amount of from about 20% to about 80% by weight of cement ("bwoc"), from about 28% to about 60% bwoc, or from about 36% to about 66% bwoc.

In several exemplary embodiments, the density of the cementitious slurry is from about 7.0 pounds per gallon (ppg) to about 20.0 ppg, from about 10.0 ppg to about 18.0 ppg, or from about 13.0 ppg to about 17.0 ppg.

According to several exemplary embodiments, the cement composition includes a hydraulic cement. According to several exemplary embodiments, a variety of hydraulic cements may be utilized, including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, shale cements, acid/base cements, fly ash cements, zeolite cement systems, kiln dust cement systems, microfine cements, metakaolin, pumice and combinations thereof. In several exemplary embodiments, the hydraulic cement may comprise a Portland cement. The Portland cements that are suitable for use in certain exemplary embodiments are classified as Classes A, C, H, and G cements according to the American Petroleum Institute, API Specification for Materials and Testing for Well Cements, API Specification 10, Fifth Ed., Jul. 1, 1990. In several exemplary embodiments, the cement is Class G or Class H cement.

According to several exemplary embodiments, the cement composition includes one or more modifying additives. Such additives include, without limitation, resins, latex, stabilizers, silica, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, and formation conditioning agents.

According to several exemplary embodiments, the LAS-SENITE® pozzolan-based additive in the water-based drilling mud composition has pozzolanic activity and when the water-based drilling mud is present in the cementitious composition, the rheological properties of the cement composition are not adversely affected and the LASSENITE® pozzolan-based additive functions as a strength retrogression inhibitor and inhibits or prevents a decline in the compressive strength of the cementitious composition over time.

According to several exemplary embodiments, the water-based drilling mud composition is present in the cementitious composition in an amount of up to about 75% by volume of the cementitious composition and the cementitious composition attains a compressive strength of at least about 50 psi after curing for about 24 hours at 120° F. or at least about 250 psi after curing for about 48 hours at 120° F.

According to several exemplary embodiments, the water-based drilling mud composition is present in the cementitious composition in an amount of up to about 50% by volume of the cementitious composition and the cementitious composition attains a compressive strength of at least about 225 psi after curing for about 24 hours at 120° F. or at least about 500 psi after curing for about 48 hours at 120° F.

According to several exemplary embodiments, the water-based drilling mud composition is present in the cementitious composition in an amount of up to about 25% by volume of the cementitious composition and the cementitious composition attains a compressive strength of at least about 675 psi after curing for about 24 hours at 120° F. or at least about 975 psi after curing for about 48 hours at 120° F.

According to several exemplary embodiments, the water-based drilling mud composition is present in the cementitious composition in an amount of up to about 10% by volume of the cementitious composition and the cementitious composition attains a compressive strength of at least about 1200 psi after curing for about 24 hours at 120° F. or at least about 1700 psi after curing for about 48 hours at 120° F.

According to several exemplary embodiments, the water-based drilling mud composition is present in the cementitious composition in an amount of from about 10% to about 75% by volume of the cementitious composition, from about 10% to about 50% by volume of the cementitious composition, and from about 25% to about 50% by volume of the cementitious composition.

According to several exemplary embodiments, a method for cementing in a subterranean formation is provided. The method comprises introducing a cement composition into a subterranean formation and allowing the cement composition to mix with a water-based drilling mud present in the subterranean formation, wherein the mixture of the cement composition and the water-based drilling mud may include up to about 75% by volume of the water-based drilling mud. According to several exemplary embodiments, the cementitious composition includes the water-based drilling mud and the cement composition, as described above.

The exemplary water-based drilling mud disclosed herein may directly or indirectly affect one or more components or pieces of equipment associated with the preparation, delivery, recapture, recycling, reuse, and/or disposal of the disclosed water-based drilling mud. For example, and with reference to the FIGURE, the disclosed water-based drilling mud may directly or indirectly affect one or more components or pieces of equipment associated with an exemplary wellbore drilling assembly 100, according to one or more embodiments. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122, such as the water-based drilling mud, through a feed pipe 124 and to the kelly 110, which conveys the water-based drilling mud 122 downhole through the interior of the drill string 108 and through one or more orifices in the drill bit 114. The water-based drilling mud 122 is then circulated back to the surface via an annulus 126 defined between the drill string 108 and the walls of the borehole 116. At the surface, the recirculated or spent water-based drilling mud 122 exits the annulus 126 and may be conveyed to one or more fluid processing unit(s) 128 via an interconnecting flow line 130. After passing through the fluid processing unit(s) 128, a "cleaned" water-based drilling mud 122 is deposited into a nearby retention pit 132 (i.e., a mud pit).

While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed components may be added to the water-based drilling mud 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the water-based drilling mud 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed additives may be stored, reconditioned, and/or regulated until added to the water-based drilling mud 122.

As mentioned above, the disclosed water-based drilling mud may directly or indirectly affect the components and equipment of the drilling assembly 100. For example, the disclosed water-based drilling mud may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary water-based drilling mud.

The disclosed water-based drilling mud may directly or indirectly affect the pump 120, which representatively includes any conduits, pipelines, trucks, tubulars, and/or pipes used to fluidically convey the water-based drilling mud downhole, any pumps, compressors, or motors (e.g., topside or downhole) used to drive the water-based drilling mud into motion, any valves or related joints used to regulate the pressure or flow rate of the water-based drilling mud, and any sensors (i.e., pressure, temperature, flow rate, etc.), gauges, and/or combinations thereof, and the like. The disclosed water-based drilling mud may also directly or indirectly affect the mixing hopper 134 and the retention pit 132 and their assorted variations.

The disclosed water-based drilling mud may also directly or indirectly affect the various downhole equipment and tools that may come into contact with the water-based drilling mud such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed water-based drilling mud may also directly or indirectly affect any downhole heat exchangers, valves and corresponding actuation devices, tool seals, packers and other wellbore isolation devices or components, and the like associated with the wellbore 116. The disclosed water-based drilling mud may also directly or indirectly affect the drill bit 114, which may include, but is not limited to, roller cone bits, PDC bits, natural diamond bits, any hole openers, reamers, coring bits, etc.

While not specifically illustrated herein, the disclosed water-based drilling mud may also directly or indirectly affect any transport or delivery equipment used to convey the water-based drilling mud to the drilling assembly 100 such as, for example, any transport vessels, conduits, pipelines, trucks, tubulars, and/or pipes used to fluidically move the water-based drilling mud from one location to another, any pumps, compressors, or motors used to drive the water-based drilling mud into motion, any valves or related joints used to regulate the pressure or flow rate of the water-based drilling mud, and any sensors (i.e., pressure and temperature), gauges, and/or combinations thereof, and the like.

The following examples are illustrative of the compositions and methods discussed above.

EXAMPLES

Composition Analysis of LASSENITE® pozzolan-based additive

LASSENITE® pozzolan-based additive was obtained from AquaFirst Technologies, Inc. and was analyzed by X-Ray Fluorescence (XRF) to determine the composition of the LASSENITE® pozzolan-based additive in terms of molar oxide ratios. The oxide content results are shown in Table 1 below.

TABLE 1

| Oxide Content of LASSENITE ® (XRF Analysis) | |
| --- | --- |
| Oxide | % |
| $SiO_2$ | 70.54 |
| $Al_2O_3$ | 12.44 |
| $Na_2O$ | 3.82 |
| MgO | 0.82 |
| $SO_3$ | 1.6 |
| $K_2O$ | 1.48 |
| CaO | 2.32 |
| $TiO_2$ | 0.62 |
| $Fe_2O_3$ | 6.36 |

Water-Based Drilling Mud Preparation: Examples 1 and 2

Two water-based drilling muds, each having a density of 12.0 ppg and a composition as set forth in Table 2 below, were prepared for testing purposes.

TABLE 2

| Water-Based Drilling Mud Compositions (Density 12.0 ppg) | | |
| --- | --- | --- |
| | Amount (lb/bbl) | |
| Material | Example 1 | Example 2 |
| Water | 274.14 | 279.44 |
| LASSENITE ® pozzolan-based additive | 114.34 | 114.34 |
| Baroid ® Weighting Agent | 114.34 | 114.34 |
| BARAZAN ® D PLUS Viscosifier/Suspension Agent | 0.57 | 0.57 |
| Econolite ™ Additive | 2.28 | — |
| VersaSet Thixotropic Additive | — | 5.71 |
| CFR-3L ™ Disperant | 1.20 | 1.20 |

The water-based drilling mud composition of Example 1 included tap water, LASSENITE® pozzolan-based additive, Baroid® weighting agent, BARAZAN®D PLUS viscosifier/suspension agent, Econolite™ additive, and CFR-3L™ dispersant.

LASSENITE® pozzolan-based additive as described above was obtained from AquaFirst Technologies, Inc. Baroid® weighting agent is a heavy-weight additive that includes ground barium sulfate and is commercially available from Halliburton Energy Services. BARAZAN® D PLUS viscosifier/suspension agent is a viscosifier that includes powdered Xanthan gum and is commercially available from Halliburton Energy Services. Econolite™ additive is a sodium metasilicate cement set activator which is commercially available from Halliburton Energy Services. CFR-3L™ dispersant is an organosulfur compound dispersant and is commercially available from Halliburton Energy Services.

The water-based drilling mud composition of Example 2 included water, LASSENITE® pozzolan-based additive, Baroid® weighting agent, BARAZAN®D PLUS viscosifier/suspension agent, VersaSet thixotropic additive, and CRF-3L™ dispersant. The water, LASSENITE® pozzolan-based additive, Baroid® weighting agent, BARAZAN®D PLUS viscosifier/suspension agent, and CFR-3L™ dispersant are described above. VersaSet thixotropic additive is a set activator that includes sodium aluminate and is commercially available from Halliburton Energy Services.

The water-based drilling mud compositions of Examples 1 and 2 were prepared by dry-blending the LASSENITE® pozzolan-based additive, Baroid® weighting agent, BARAZAN®D PLUS viscosifier/suspension agent, and Econolite™ additive or VersaSet thixotropic additive. The dry blend was then suspended in water containing CFR-3L™ dispersant under stirring, using an overhead stirrer, for 15 minutes.

Conventional Drilling Mud Preparation

In order to compare the properties of the water-based drilling mud compositions of Examples 1 and 2, a conventional drilling mud composition, having a density of 12.0 ppg and a composition as set forth in Table 3 below, was prepared.

TABLE 3

Conventional Drilling Mud Composition (Density 12.0 ppg)

| Material | Amount (lb/bbl) |
| --- | --- |
| Water | 299.74 |
| Baroid ® Weighting Agent | 195.74 |
| Aquagel Gold Seal ® Viscosifier | 5.00 |
| Dextrid ® E Filtration Control Additive | 2.00 |
| PAC-R ™ Filtration Control Additive | 1.00 |
| BARAZAN ® D PLUS Viscosifier/Suspension Agent | 0.50 |
| Barabuf ® pH Buffer | 0.25 |

The conventional drilling mud contained water, Baroid® weighting agent and BARAZAN® D PLUS viscosifier/suspension agent, as described above. Aquagel Gold Seal® viscosifier is a viscosifier that includes a mixture of silica and clay and is commercially available from Halliburton Energy Services. Dextrid® E filtration control additive is a fluid loss control additive that includes modified starch, and is commercially available from Halliburton Energy Services. PAC-R™ filtration control additive is a fluid loss control agent that includes polysaccharides, and is commercially available from Halliburton Energy Services. Barabuf® pH buffer is a pH control agent that includes magnesium oxide, and is available from Halliburton Energy Services.

The exemplary conventional drilling mud was prepared by adding BARAZAN® D PLUS viscosifier/suspension agent and Aquagel Gold Seal® viscosifier to water under mixing at 11500rpm in a multimixer for 15 minutes. Dextrid® E filtration control additive and PAC-R™ filtration control additive were added and stirred for 10 minutes. Barabuf® pH buffer was added and stirred for 2 minutes. Finally, Baroid® weighting agent was added and stirred for 10 minutes.

Mud Stability Test

The water-based drilling mud compositions of Examples 1 and 2 were tested for settling and gelation by placing both compositions in a water bath and maintaining the temperature at 120° F. for 7 days. After 7 days, the mud was analyzed and no settling or gelation had occurred. This test demonstrates that water-based drilling muds prepared according to the procedures set out above will remain in liquid form and will not gel after being pumped into a wellbore.

Compatibility of Water-Based Drilling Mud Compositions of Examples 1 and 2 and an Exemplary Cement Slurry A first exemplary cement slurry using Class H Cement, having a density of 15.8 ppg, was prepared. The composition of the first exemplary cement slurry is set forth below in Table 4.

TABLE 4

First Exemplary Cement Slurry Composition (Density 15.8 ppg)

| Material | Amount (% bwoc) |
| --- | --- |
| Water | 44.75 |
| Class H Cement | 100 |
| HALAD ®-344 Fluid Loss Additive | 0.4 |
| CFR-3L ™ Dispersant | 0.05 gal/sk |

HALAD®-344 fluid loss additive is a fluid loss control additive that includes an acrylamide copolymer and is commercially available from Halliburton Energy Services. CFR-3L™ dispersant is described above.

The first exemplary cement slurry was mixed in different volumetric proportions with the water-based drilling mud compositions of Examples 1 and 2, and the conventional drilling mud respectively. The rheology of the mixtures was measured using a Fann 35 viscometer.

The mixtures were also tested for their compressive strength development. The mixtures were poured into molds for forming cubes and the mixtures were cured at 120° F. in a water bath for 48 hours. The cured cubes were crushed using a hydraulic press (Universal Testing Machine) to determine the crush strength of each mixture. The viscosity and crush strength results are shown in Tables 5-7 below.

TABLE 5

Rheology and Crush Strength of the First Exemplary Cement Slurry Contaminated with the Water-Based Drilling Mud Composition of Example 1

| Composition (% v) | | Fann 35 Viscosity number | | | | | | | | Crush Strength |
| --- | --- | --- | --- | --- | --- | --- | --- | --- | --- | --- |
| Mud | Cement | 600 | 300 | 200 | 100 | 60 | 30 | 6 | 3 | (psi) |
| 100 | 0 | 81 | 53 | 42 | 29 | 23 | 17 | 10 | 8 | — |
| 75 | 25 | 118 | 80 | 61 | 42 | 30 | 24 | 14 | 12 | 301 |
| 50 | 50 | 118 | 85 | 63 | 43 | 29 | 23 | 16 | 14 | 519 |
| 25 | 75 | 140 | 92 | 71 | 43 | 30 | 19 | 14 | 10 | 987 |
| 10 | 90 | 168 | 112 | 82 | 51 | 35 | 22 | 11 | 8 | 1866 |
| 0 | 100 | 115 | 63 | 42 | 24 | 15 | 9 | 5 | 3 | 3080 |

TABLE 6

Rheology and Crush Strength of the First
Exemplary Cement Slurry Contaminated with
the Water-Based Drilling Mud Composition of Example 2

| Composition (% v) | | Fann 35 Viscosity number | | | | | | | Crush Strength |
|---|---|---|---|---|---|---|---|---|---|
| Mud | Cement | 600 | 300 | 200 | 100 | 60 | 30 | 6 | 3 | (psi) |
| 100 | 0 | 83 | 52 | 39 | 26 | 20 | 13 | 6 | 4 | — |
| 75 | 25 | 155 | 107 | 84 | 58 | 42 | 30 | 16 | 12 | 256 |
| 50 | 50 | 156 | 119 | 91 | 58 | 44 | 30 | 25 | 20 | 575 |
| 25 | 75 | 147 | 107 | 80 | 52 | 37 | 26 | 18 | 15 | 1241 |
| 10 | 90 | 148 | 95 | 73 | 50 | 37 | 25 | 10 | 6 | 1743 |
| 0 | 100 | 115 | 63 | 42 | 24 | 15 | 9 | 5 | 3 | 3080 |

TABLE 7

Rheology and Crush Strength of the First
Exemplary Cement Slurry Contaminated with
the Conventional Water-Based Drilling Mud Composition

| Composition (% v) | | Fann 35 Viscosity number | | | | | | | Crush Strength |
|---|---|---|---|---|---|---|---|---|---|
| Mud | Cement | 600 | 300 | 200 | 100 | 60 | 30 | 6 | 3 | (psi) |
| 100 | 0 | 81 | 53 | 42 | 29 | 23 | 17 | 10 | 8 | — |
| 75 | 25 | 136 | 92 | 77 | 59 | 48 | 38 | 27 | 23 | Did not set |
| 10 | 90 | 184 | 118 | 95 | 64 | 47 | 31 | 20 | 15 | 982 |

The Fann 35 Viscosity numbers for the first exemplary cement slurry contaminated with the water-based drilling mud compositions of Examples 1 and 2 were comparable to those of the first exemplary cement slurry contaminated with the conventional water-based drilling mud composition. These results demonstrate that the water-based drilling mud compositions of Examples 1 and 2 had a comparable effect on the rheological properties of the first exemplary cement slurry as the conventional water-based drilling mud composition. These results also demonstrate that when the first exemplary cement slurry is contaminated with the water-based drilling mud compositions of Examples 1 and 2, even up to as much as 75% by volume, the rheology of the first exemplary cement slurry remains within an acceptable range such that the slurry is pourable and can be pumped easily.

The results shown in Tables 5 and 6 demonstrate that the first exemplary cement slurry will set and develop crush strength when the first exemplary cement slurry is contaminated with up to 75% by volume of the water-based drilling mud compositions of Examples 1 and 2. Conversely, the results shown in Table 7 demonstrate that the first exemplary cement slurry will set and develop crush strength when the first exemplary cement slurry is contaminated with no more than 10% by volume of the conventional water-based drilling mud.

In addition, the crush strength of the first exemplary cement slurry contaminated with 10% by volume of the conventional water-based drilling mud was only 982 psi, whereas, the crush strength of the first exemplary cement slurry contaminated with 10% by volume of the water-based drilling mud compositions of Examples 1 and 2 was 1866 psi and 1743 psi, respectively. These results show that when the first exemplary cement slurry was contaminated with 10% by volume of the water-based drilling muds of Examples 1 and 2, the first exemplary cement slurry developed a crush strength that was significantly higher than when the first exemplary cement slurry was contaminated with 10% by volume of the conventional water-based drilling mud.

Accordingly, the results shown in Tables 5-6 demonstrate that when the first exemplary cement slurry is contaminated with up to 75% by volume of the water-based drilling mud compositions of Examples 1 and 2, the first exemplary cement slurry will nevertheless set and develop sufficient crush strength to be useful in cementing operations. Thus, the water-based drilling mud compositions of Examples 1 and 2 are particularly useful as drilling muds because even if they are not completely removed from a wellbore prior to cementing, they will not prevent the cement slurry introduced into the wellbore from setting and developing sufficient crush strength.

Water-Based Drilling Mud Preparation: Examples 3 and 4

Two water-based drilling muds, each having a density of 12.0 ppg and a composition as set forth in Table 8 below, were prepared for testing purposes.

TABLE 8

Water-Based Drilling Mud Compositions (Density 12.0 ppg)

| | Amount (lb/bbl) | |
|---|---|---|
| Material | Example 3 | Example 4 |
| Water | 266.06 | 269.51 |
| LASSENITE ® pozzolan-based additive | 113.46 | 113.04 |
| Baroid ® Weighting Agent | 113.46 | 113.04 |
| Econolite ™ Additive | 2.269 | — |
| BARAZAN ® D PLUS Viscosifier/Suspension Agent | 0.567 | 0.344 |
| PAC-LE ™ Filtration Control Additive | 3.00 | 2.26 |
| ClaySeal Plus ™ Shale Stabilizer | 7.65 | — |
| BORE-HIB ™ Shale Stabilizer | — | 6.81 |
| CFR-3L ™ Dispersant | 1.191 | 2.34 |
| % Shale Recovery | 68.4 | 91.6 |
| Fluid Loss | 4 ml | 6 ml |

The water-based drilling mud composition of Example 3 included water, LASSENITE® pozzolan-based additive, Baroid® weighting agent, Econolite™ additive, BARAZAN®D PLUS viscosifier/suspension agent, PAC-LE™ filtration control additive, ClaySeal Plus™ shale stabilizer and CFR-3L™ dispersant. The water, LASSENITE® pozzolan-based additive, Baroid® weighting agent, Econolite™ additive, BARAZAN®D PLUS viscosifier/suspension agent and CFR-3L™ dispersant are described above. PAC-LE™ filtration control additive is a fluid loss control additive that includes carbohydrates and is commercially available from Halliburton Energy Services. ClaySeal Plus™ shale stabilizer is a shale stabilizer that includes ethoxylated polyamine and is available from Halliburton Energy Services.

The water-based drilling mud composition of Example 4 included water, LASSENITE® pozzolan-based additive, Baroid® weighting agent, BARAZAN®D PLUS viscosifier/suspension agent, PAC-LE™ filtration control additive, BORE-HIB™ shale stabilizer and CFR-3L™ dispersant. The water, LASSENITE® pozzolan-based additive, Baroid® weighting agent, BARAZAN®D PLUS viscosifier/suspension agent, PAC-LE™ filtration control additive and CFR-3L™ dispersant are described above. BORE-HIB™ shale stabilizer is a shale stabilizer that includes a mixture of glycerine and silicates and is commercially available from Halliburton Energy Services.

The water-based drilling muds of Examples 3 and 4 were prepared by adding the set activator, Econolite™ additive, followed by the viscosifier, BARAZAN® D PLUS viscosifier/suspension agent in water under mixing at 11500 rpm in a multimixer for 15 minutes. Next, the fluid loss control additive, PAC-LE™ filtration control additive was added and the mixture was stirred for 10 minutes. Then, the dispersant, CFR-3L™ dispersant was added and the mixture was stirred for 2 minutes. Next, the shale stabilizer, ClaySeal Plus™ shale stabilizer or BORE-HIB™ shale stabilizer was added and the mixture was stirred for 2 minutes. Then, heavy-weight additive, Baroid® weighting agent and the LasscnitoLASSENITE® pozzolan-based additive were added and the mixture was stirred for 10 minutes.

Fluid Loss Test

Fluid loss was measured using a standard API fluid loss apparatus with a 100 psi differential at room temperature. As shown in Table 8, the filtrate volume collected in 30 minutes for the water-based drilling muds of Examples 3 and 4, were 4 ml and 6 ml, respectively. An ideal drilling mud should perform in such a way that it delays, prevents or at least suppresses the loss of fluid into the formation. Thus, it is desirable for the rate of fluid loss to be as low as possible. As shown in Table 8, the drilling muds of Examples 3 and 4 had a fluid loss of less than 10 ml. in 30 minutes which is demonstrates that these drilling muds have excellent fluid loss properties.

Shale Recovery Test

The shale recovery test was performed using shale samples of London Clay from Southeast England and Pierre outcrop cuttings from eastern North Dakota in the United States. The shale samples were kept in an oven overnight at 100° C. for drying. The dried shale samples were then crushed in a mortar with a pestle and screened to obtain shale cuttings that passed through a 5 ASTM mesh screen (4 mm), but were retained on a 10 ASTM mesh screen (2mm) The graded shale samples (30 grams) were then placed in a pint-sized jar containing samples of the water-based drilling mud compositions of Examples 3 and 4. The mud and shale sample mixtures in the pint jars were hot rolled at 140° F. After completion of the hot rolling, the shale cuttings were once again passed through a 5 ASTM mesh screen and a 10 ASTM mesh screen. The cuttings that were retained on the 10 ASTM mesh screen were washed with water, dried at 100° C. and weighed.

As shown in Table 8, the water-based drilling mud composition of Example 3 yielded a shale recovery of 68.4% while the water-based drilling mud composition of Example 4 yielded a shale recovery of 91.6%. In an ideal situation, the water-based drilling fluid would yield a shale recover of 100%. Thus, the results shown in Table 8 demonstrate that the water-based drilling mud compositions of Examples 3 and 4 have excellent shale recovery properties.

Compatibility of Water-Based Drilling Mud Composition of Example 4 and a Second Exemplary Cement Slurry A second exemplary cement slurry using Class H cement, having a density of 15.8 ppg was prepared. The composition of the second exemplary cement slurry is set forth below in Table 9.

TABLE 9

Second Exemplary Cement Slurry Composition (Density 15.8 ppg)

| Material | Amount (% bwoc) |
| --- | --- |
| Water | 44.68 |
| Class H Cement | 100 |
| HALAD ®-344 Fluid Loss Additive | 0.5 |
| CFR-3L ™ Dispersant | 0.06 gal/sk |

HALAD®-344 fluid loss additive and CFR-3L™ dispersant are described above.

The second exemplary cement slurry was mixed in different volumetric proportions with the water-based drilling mud composition of Example 4 and the conventional drilling mud prepared above, respectively. The rheology of the mixtures was measured using a Fann 35 viscometer.

The mixtures were also tested for their compressive strength development. The mixtures were cured at 120° F. in a water bath for 24 hours. The cured cubes were crushed to determine the crush strength of each mixture. The viscosity and crush strength results are summarized in Tables 10-11 below.

TABLE 10

Rheology and Crush Strength of the Second Exemplary Cement Slurry Contaminated with the Water-Based Drilling Mud Composition of Example 4

| Composition (% v) | | Fann 35 Viscometer number | | | | | | | | Crush Strength |
| --- | --- | --- | --- | --- | --- | --- | --- | --- | --- | --- |
| Mud | Cement | 600 | 300 | 200 | 100 | 60 | 30 | 6 | 3 | (psi) |
| 100 | 0 | 173 | 112 | 89 | 58 | 42 | 30 | 12 | 9 | — |
| 75 | 25 | 153 | 101 | 77 | 49 | 36 | 24 | 10 | 7 | 51 |
| 50 | 50 | 170 | 120 | 89 | 60 | 43 | 31 | 18 | 15 | 225 |
| 25 | 75 | 190 | 125 | 97 | 64 | 48 | 34 | 19 | 16 | 677 |
| 10 | 90 | 192 | 122 | 95 | 63 | 45 | 30 | 15 | 11 | 1224 |
| 0 | 100 | 163 | 87 | 62 | 35 | 24 | 13 | 4 | 3 | 1694 |

TABLE 11

Rheology and Crush Strength of the Second Exemplary Cement Slurry Contaminated with the Conventional Water-Based Drilling Mud Composition

| Composition (% v) | | Fann 35 Viscometer number | | | | | | | | Crush Strength |
| --- | --- | --- | --- | --- | --- | --- | --- | --- | --- | --- |
| Mud | Cement | 600 | 300 | 200 | 100 | 60 | 30 | 6 | 3 | (psi) |
| 100 | 0 | 81 | 53 | 42 | 29 | 23 | 17 | 10 | 8 | — |
| 10 | 90 | 172 | 101 | 74 | 46 | 32 | 19 | 6 | 4 | 96 |
| 0 | 100 | 163 | 87 | 62 | 35 | 24 | 13 | 4 | 3 | 1694 |

The Fann 35 Viscosity numbers for the second exemplary cement slurry contaminated with the water-based drilling mud composition of Example 4 were comparable to those of the second exemplary cement slurry contaminated with the conventional water-based drilling mud composition. These results demonstrate that the water-based drilling mud composition of Example 4 had a comparable effect on the rheological properties of the second exemplary cement slurry as the conventional water-based drilling mud composition. These results also demonstrate that when the second exemplary cement slurry is contaminated with the water-based drilling mud composition of Example 4, even up to as much as 75% by volume, the rheology of the second exemplary cement slurry remains within an acceptable range such that the slurry is pourable and can be pumped easily.

The results shown in Table 10 demonstrate that the second exemplary cement slurry will set and develop crush strength when the second exemplary cement slurry is contaminated with up to 75% by volume of the water-based drilling mud composition of Example 4. Conversely, the results shown in Table 11 demonstrate that the second exemplary cement slurry will set and develop crush strength when the second exemplary cement slurry is contaminated with no more than 10% by volume of the conventional water-based drilling mud.

In addition, the crush strength of the second exemplary cement slurry contaminated with 10% by volume of the conventional water-based drilling mud was only 96 psi, whereas, the crush strength of the second exemplary cement slurry contaminated with 10% by volume of the water-based drilling mud composition of Example 4 was 1224 psi. This result shows that when the second exemplary cement slurry was contaminated with 10% by volume of the water-based drilling mud of Example 4, the second exemplary cement slurry developed a crush strength that was significantly higher than when the second exemplary cement slurry was contaminated with 10% by volume of the conventional water-based drilling mud.

Accordingly, the results shown in Table 10 demonstrate that when the second exemplary cement slurry is contaminated with up to 75% by volume of the water-based drilling mud composition of Example 4, the second exemplary cement slurry will nevertheless set and develop sufficient crush strength to be useful in cementing operations. Thus, the water-based drilling mud composition of Example 4 is particularly useful as a drilling mud because even if it is not completely removed from a wellbore prior to cementing, it will not prevent the cement slurry introduced into the wellbore from setting and developing sufficient crush strength.

While the present invention has been described in terms of several exemplary embodiments, those of ordinary skill in the art will recognize that the invention can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A water-based drilling mud composition, consisting essentially of:
   water;
   an aluminosilicate;
   a weighting agent;
   a viscosifier;
   a dispersant;
   a set activator;
   a fluid loss control additive; and
   a shale stabilizer,
   wherein the water-based drilling mud composition has a density of about 12.0 pounds per gallon (ppg) and exhibits fluid loss of less than 10 mL in 30 minutes at room temperature and a 100 psi differential.

2. The composition of claim 1, wherein the aluminosilicate comprises silicon dioxide ($SiO_2$) and aluminum oxide ($Al_2O_3$).

3. The composition of claim 2, wherein the silicon dioxide ($SiO_2$) and aluminum oxide ($Al_2O_3$), comprise at least 80% by weight of the total oxide content of the aluminosilicate.

4. The composition of claim 2, wherein the silicon dioxide ($SiO_2$) comprises from about 65% to about 75% by weight of the total oxide content of the aluminosilicate; and wherein the aluminum oxide ($Al_2O_3$) comprises from about 10% to about 15% by weight of the total oxide content of the aluminosilicate.

5. The composition of claim 1, wherein the weighting agent is selected from barium sulfate, iron powder, metal oxides and combinations thereof.

6. The composition of claim 1, wherein the viscosifier is selected from polysaccharide polymers, synthetic polymers and combinations thereof.

7. The composition of claim 1, wherein the dispersant is selected from organosulfur compounds, polycarboxylate ethers and combinations thereof.

8. The composition of claim 1, wherein the set activator is selected from soluble silicates, soluble aluminates, alkali metal hydroxides, alkali earth metal hydroxides, alkali carbonates, alkali hydrogen carbonates, alkali earth metal carbonates and combinations thereof.

9. The composition of claim 8, wherein the set activator is selected from sodium silicate, sodium aluminate, sodium hydroxide, potassium hydroxide, calcium hydroxide, magnesium hydroxide, sodium carbonate, potassium carbonate, sodium hydrogen carbonate, potassium hydrogen carbonate, and calcium carbonate.

10. The composition of claim 1, consisting essentially of:
    from about 250.0 to about 280.0 lb/bbl of water;
    from about 100.0 to about 120.0 lb/bbl of the aluminosilicate;
    from about 100.0 to about 120.0 lb/bbl of the weighting agent;
    from about 0.2 to about 0.7 lb/bbl of the viscosifier;
    from about 1.0 to about 3.0 lb/bbl of the set activator; and
    from about 0.5 to about 3.0 lb/bbl of the dispersant.

11. A method of cementing in a subterranean formation, comprising:
    introducing a cement composition into a subterranean formation wherein the subterranean formation comprises a water-based drilling mud, wherein the water-based drilling mud consists essentially of water, an aluminosilicate, a weighting agent, a viscosifier, a dispersant, a set activator, a fluid loss control additive, and a shale stabilizer, wherein the water-based drilling mud has a density of about 12.0 pounds per gallon (ppg) and exhibits fluid loss of less than 10mL in 30 minutes at room temperature and a 100 psi differential;
    allowing the cement composition to mix with the water-based drilling mud, wherein the mixture of the cement composition and the water-based drilling mud comprises up to about 75percent by volume of the water-based drilling mud; and
    allowing the mixture of the cement composition and the water-based drilling mud to set, wherein the set mixture of the cement composition and the water-based drilling mud develops a crush strength of at least 50 psi.

12. The method according to claim 11, wherein the aluminosilicate is present in the water-based drilling mud in an amount of from about 100.0 to about 120.0 lb/bbl.

13. The method according to claim 11, wherein:
    the water is present in the water-based drilling mud in an amount of from about 250.0 to about 280.0 lb/bbl;
    the weighting agent is present in the water-based drilling mud in an amount of from about 100.0 to about 120.0 lb/bbl;
    the viscosifier is present in the water-based drilling mud in an amount of from about 0.2 to about 0.7 lb/bbl;
    the set activator is present in the water-based drilling mud in an amount of from about 1.0 to about 3.0 lb/bbl; and the dispersant is present in the water-based drilling mud in an amount of from about 0.5 to about 3.0 lb/bbl.

14. A cementitious composition, comprising:
a water-based drilling mud composition and a cement composition,
wherein the water-based drilling mud consists essentially of:
water;
an aluminosilicate;
a weighting agent;
a viscosifier;
a dispersant;
a set activator;
a fluid loss control additive; and
a shale stabilizer,
wherein the water-based drilling mud has a density of about 12.0 pounds per gallon (ppg) and exhibits fluid loss of less than 10 mL in 30 minutes at room temperature and a 100 psi differential;
wherein the cement composition comprises:
an aqueous fluid; and
cement;
wherein the cementitious composition comprises up to about 75% by volume of the water-based drilling mud composition; and
wherein the cementitious composition develops a crush strength of at least about 50 psi at about 24 hours after curing at 120° F.

15. The cementitious composition according to claim 14, wherein the cementitious composition comprises up to about 50% by volume of the water-based drilling mud composition; and
wherein the cementitious composition develops a crush strength of at least about 225 psi at about 24 hours after curing at 120° F.

16. The cementitious composition according to claim 14, wherein the cementitious composition comprises from about 10% to about 75% by volume of the water-based drilling mud composition.

17. A system for drilling a subterranean wellbore, comprising:
a drill string including a drill bit; and
a water-based drilling mud composition, wherein the drilling mud composition, consists essentially of:
water;
an aluminosilicate;
a weighting agent;
a viscosifier;
a dispersant; and
a set activator;
a fluid loss control additive; and
a shale stabilizer,
wherein the water-based drilling mud composition has a density of about 12.0 pounds per gallon (ppg) and exhibits fluid loss of less than 10 mL in 30 minutes at room temperature and a 100 psi differential.

* * * * *